US012054829B2

(12) United States Patent
Kim et al.

(10) Patent No.: US 12,054,829 B2
(45) Date of Patent: Aug. 6, 2024

(54) PLATED STEEL SHEET HAVING EXCELLENT CORROSION RESISTANCE, GALLING RESISTANCE, WORKABILITY AND SURFACE PROPERTY

(71) Applicants: POSCO, Pohang-si (KR); STEEL & CONVERGENCE TECHNOLOGY RESEARCH ASSOCIATION, Pohang-si (KR); POSCO COATED & COLOR STEEL CO., LTD., Pohang-si (KR)

(72) Inventors: Sung-Joo Kim, Gwangyang-si (KR); Kyung-Kwan Park, Pohang-si (KR); Moon-Hi Hong, Pohang-si (KR); Heung-Yun Kim, Pohang-si (KR); Tae-Yeul Park, Pohang-si (KR); Myung-Soo Kim, Gwangyang-si (KR); Il-Ryoung Sohn, Gwangyang-si (KR); Tae-Chul Kim, Gwangyang-si (KR); Dae-Young Kang, Gwangyang-si (KR)

(73) Assignees: POSCO, Pohang-si (KR); STEEL & CONVERGENCE TECHNOLOGY RESEARCH ASSOCIATION, Pohang-si (KR); POSCO COATED & COLOR STEEL CO., LTD., Pohang-si (KR)

( * ) Notice: Subject to any disclaimer, the term of this patent is extended or adjusted under 35 U.S.C. 154(b) by 0 days.

(21) Appl. No.: 17/762,533

(22) PCT Filed: Sep. 24, 2020

(86) PCT No.: PCT/KR2020/012980
§ 371 (c)(1),
(2) Date: Mar. 22, 2022

(87) PCT Pub. No.: WO2021/060879
PCT Pub. Date: Apr. 1, 2021

(65) Prior Publication Data
US 2022/0341017 A1   Oct. 27, 2022

(30) Foreign Application Priority Data

Sep. 24, 2019  (KR) .................. 10-2019-0117525
Jun. 19, 2020  (KR) .................. 10-2020-0075328

(51) Int. Cl.
*C23C 2/06*   (2006.01)
*B32B 15/01*  (2006.01)
(Continued)

(52) U.S. Cl.
CPC ............... *C23C 2/06* (2013.01); *B32B 15/01* (2013.01); *B32B 15/013* (2013.01); *B32B 15/04* (2013.01);
(Continued)

(58) Field of Classification Search
CPC ......... C23C 30/005; C23C 30/00; C23C 2/06; C23C 2/02; C23C 2/26; C23C 2/28;
(Continued)

(56) References Cited

U.S. PATENT DOCUMENTS

| 2004/0258949 A1 | 12/2004 | Honda et al. |
| 2018/0002797 A1 | 1/2018 | Oh et al. |

(Continued)

FOREIGN PATENT DOCUMENTS

| CN | 108138308 A | 6/2018 |
| CN | 110234780 A | 9/2019 |

(Continued)

OTHER PUBLICATIONS

Machine Translation, Lee et al., KR 1020140074231, Jun. 2014. (Year: 2014).*

(Continued)

*Primary Examiner* — Michael E. La Villa
(74) *Attorney, Agent, or Firm* — Morgan, Lewis & Bockius LLP

(57) ABSTRACT

Provided are a plated steel sheet and a method for manufacturing same, the plated steel sheet comprising: a base steel sheet; a Zn—Mg—Al plating layer provided on at least one surface of the base steel sheet; and an Fe—Al inhibition layer provided between the base steel sheet and the Zn—Mg—Al plating layer. The plating layer comprises, by weight %, 4 to 10% of Mg and 5.1-25% of Al and the remainder being Zn and unavoidable impurities with respect to components not including iron (Fe) diffused from the base steel sheet. The plating layer comprises a 24-50% $MgZn_2$ phase in phase fraction. In the $MgZn_2$ phase, an Al single (Continued)

phase is present in the ratio of 1-30% relative to the cross-sectional area of the total $MgZn_2$ phase.

6 Claims, 7 Drawing Sheets

(51) Int. Cl.
| | |
|---|---|
| B32B 15/04 | (2006.01) |
| B32B 15/18 | (2006.01) |
| C21D 7/06 | (2006.01) |
| C22C 18/00 | (2006.01) |
| C22C 18/04 | (2006.01) |
| C23C 2/00 | (2006.01) |
| C23C 2/02 | (2006.01) |
| C23C 2/28 | (2006.01) |
| C23C 2/40 | (2006.01) |
| C23C 28/00 | (2006.01) |
| C23C 28/02 | (2006.01) |
| C23C 30/00 | (2006.01) |

(52) U.S. Cl.
CPC ............ *B32B 15/043* (2013.01); *B32B 15/18* (2013.01); *C21D 7/06* (2013.01); *C22C 18/00* (2013.01); *C22C 18/04* (2013.01); *C23C 2/0035* (2022.08); *C23C 2/02* (2013.01); *C23C 2/285* (2013.01); *C23C 2/29* (2022.08); *C23C 2/40* (2013.01); *C23C 28/02* (2013.01); *C23C 28/021* (2013.01); *C23C 28/023* (2013.01); *C23C 28/025* (2013.01); *C23C 28/322* (2013.01); *C23C 28/3225* (2013.01); *C23C 30/00* (2013.01); *C23C 30/005* (2013.01); *Y10T 428/12951* (2015.01); *Y10T 428/12958* (2015.01); *Y10T 428/12972* (2015.01); *Y10T 428/12979* (2015.01); *Y10T 428/12993* (2015.01); *Y10T 428/24942* (2015.01); *Y10T 428/24983* (2015.01); *Y10T 428/263* (2015.01); *Y10T 428/265* (2015.01)

(58) Field of Classification Search
CPC .. C23C 2/29; C23C 2/40; C23C 2/285; C23C 28/021; C23C 28/023; C23C 28/025; C23C 28/3225; C23C 28/322; C23C 2/0035; C21D 7/06; C22C 18/00; C22C 18/04; B32B 15/01; B32B 15/013; B32B 15/04; B32B 15/043; B32B 15/18; Y10T 428/12799; Y10T 428/12951; Y10T 428/12958; Y10T 428/12972; Y10T 428/12979; Y10T 428/12993; Y10T 428/24942; Y10T 428/2495; Y10T 428/24959; Y10T 428/24967; Y10T 428/24975; Y10T 428/24983; Y10T 428/26; Y10T 428/263; Y10T 428/264; Y10T 428/265

See application file for complete search history.

(56) References Cited

U.S. PATENT DOCUMENTS

| | | | | |
|---|---|---|---|---|
| 2018/0237897 A1* | 8/2018 | Hashimoto | ........... | B32B 15/017 |
| 2018/0237900 A1 | 8/2018 | Kobayashi et al. | | |
| 2020/0002798 A1† | 1/2020 | Tokuda et al. | | |
| 2021/0010106 A1 | 1/2021 | Kim et al. | | |
| 2021/0010123 A1 | 1/2021 | Sohn et al. | | |
| 2021/0381091 A1 | 12/2021 | Kim et al. | | |
| 2022/0010420 A1 | 1/2022 | Han et al. | | |

FOREIGN PATENT DOCUMENTS

| | | | |
|---|---|---|---|
| IN | 202017046776 A | 2/2021 | |
| JP | 2001-20050 A | 1/2001 | |
| JP | 2002-206156 A | 7/2002 | |
| JP | 2003-268519 A | 9/2003 | |
| JP | 2006-283155 A | 10/2006 | |
| JP | 2010-018876 A | 1/2010 | |
| JP | 201018876 | † | 1/2010 |
| JP | 2010-100897 A | 5/2010 | |
| JP | 2010100897 | † | 5/2010 |
| JP | 2010-275632 A | 12/2010 | |
| JP | 2018-506644 A | 3/2018 | |
| JP | 6365807 B1 | 8/2018 | |
| JP | 10-2020-0076585 A | 6/2020 | |
| KR | 10-2013-0133358 A | 12/2013 | |
| KR | 10-2014-0074231 A | 6/2014 | |
| KR | 10-2015-0049254 A | 5/2015 | |
| KR | 10-2015-0051840 A | 5/2015 | |
| KR | 10-2015-0073315 A | 7/2015 | |
| KR | 10-2016-0078918 A | 7/2016 | |
| KR | 10-2019-0078509 A | 4/2019 | |
| KR | 10-2019-0078435 A | 7/2019 | |
| KR | 10-2020-0063983 A | 6/2020 | |
| KR | 10-2021-0077952 A | 6/2021 | |
| KR | 10-2021-0077953 A | 6/2021 | |
| TW | 654338 B | 3/2019 | |
| WO | 2019/132412 A1 | 7/2019 | |
| WO | WO2019/221193 A1 | 11/2019 | |

OTHER PUBLICATIONS

Extended European Search Report dated Jun. 2, 2022 issued in European Patent Application No. 20867637.9.
International Search Report dated Dec. 17, 2020 issued in International Patent Application No. PCT/KR2020/012980 (with English translation).
Lu, et al., "Research on Coating Microstructure and Corrosion Behavior of Galvanized Zn—Al—Mg Coated Steel Sheet", Materials Engineering, Oct. 20, 2012, Issue No. 10, p. 89-93 (see English Abstract).
Office Action dated Apr. 20, 2023 for counterpart Japanese Patent Application No. 2022-544033.
Office Action dated Apr. 22, 2023 for counterpart Chinese Patent Application No. 202080067414.X.
Notice of Transmittal of Duplicate of a Written Patent Opposition dated May 31, 2024 issued in Japanese Patent No. 7373671.
"Geometrical Product Specifications (GPS)-Surface texture:Profile method-Terms, definitions and surface texture parameters," JIS B 0601:2013, (ISO 4287: 1997, Amd. 1: 2009) https://kikakurui.com/b0/B0601-2013-01.html (along with English translation).
"Vickers hardness test-Test method," JIS Z 2244:2009, (ISO 0 6507-10 published in 2005, https://kikakurui.com/z2/Z2244-2009-01.html (along with English translation)
"Light conveyor belts-Determination of the coefficient of friction," JIS K 6378-2:2012, (ISo 21182 published in 2005, https://kikakurui.com/k6/K6378-3-2013-01.html (along with English translation)

\* cited by examiner
† cited by third party

[FIG. 1]
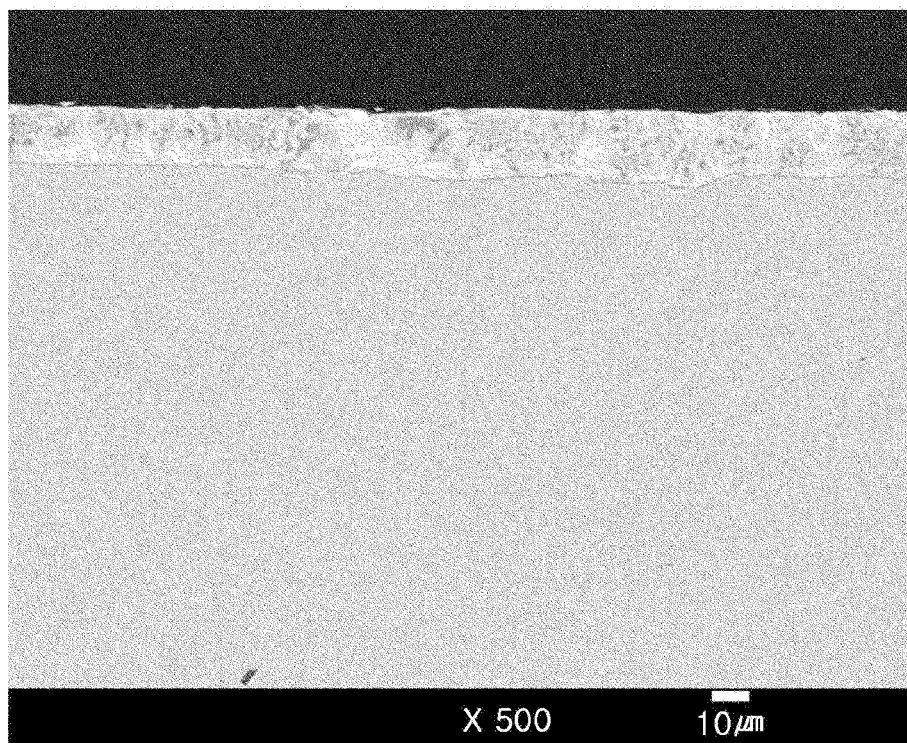

[FIG. 2]
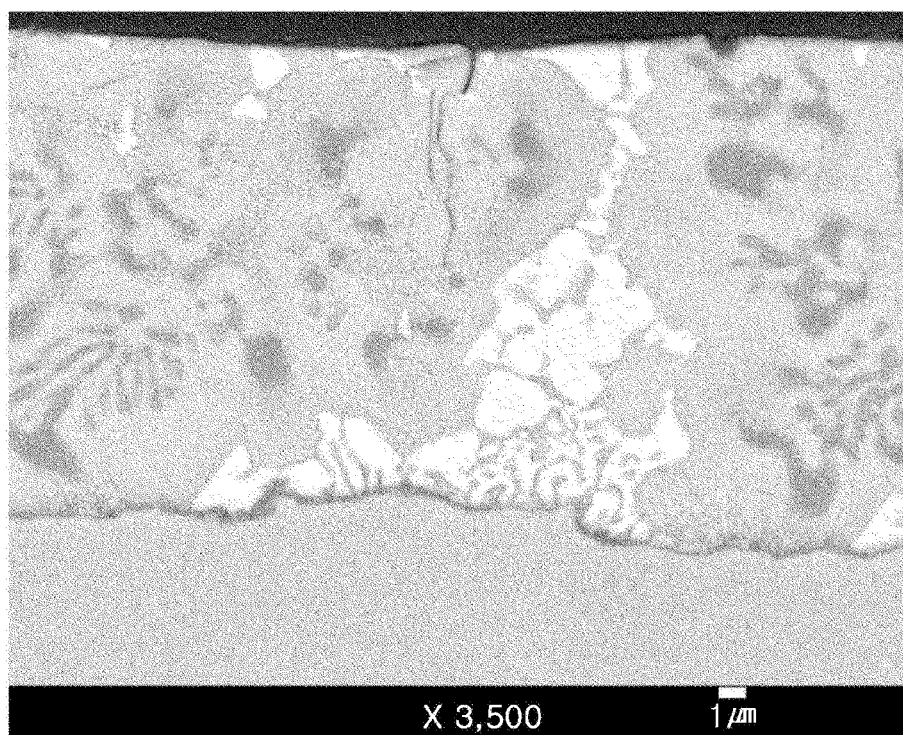

[FIG. 3]
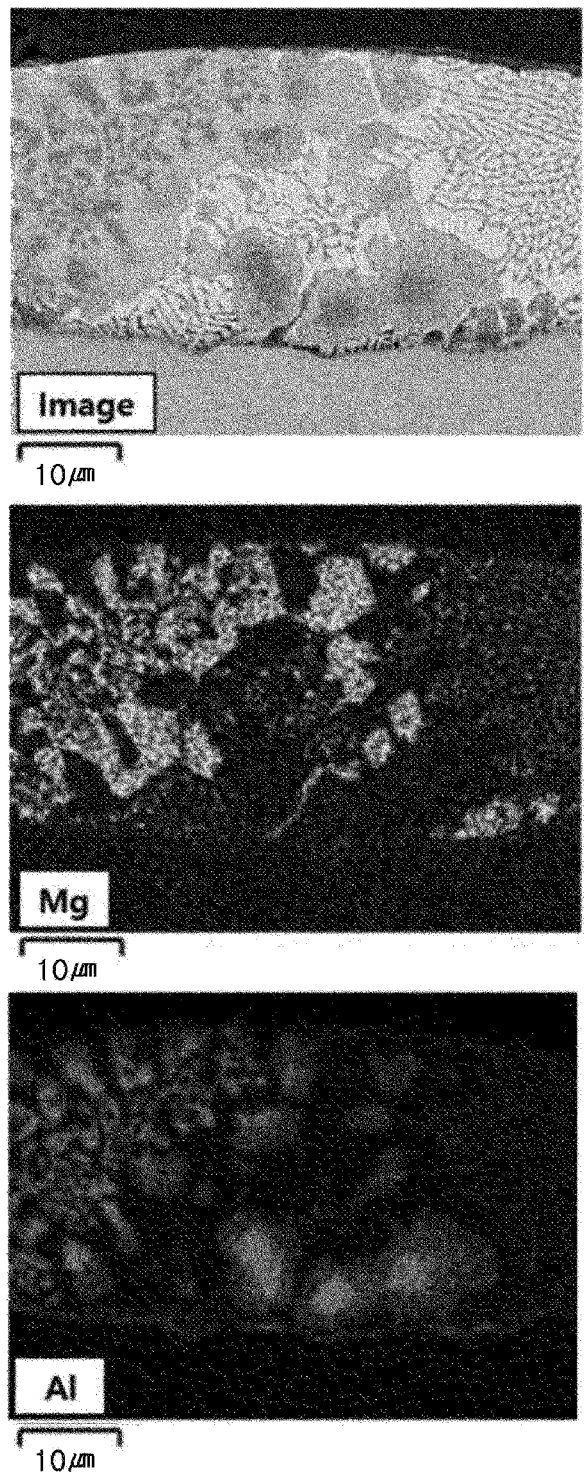

[FIG. 4]
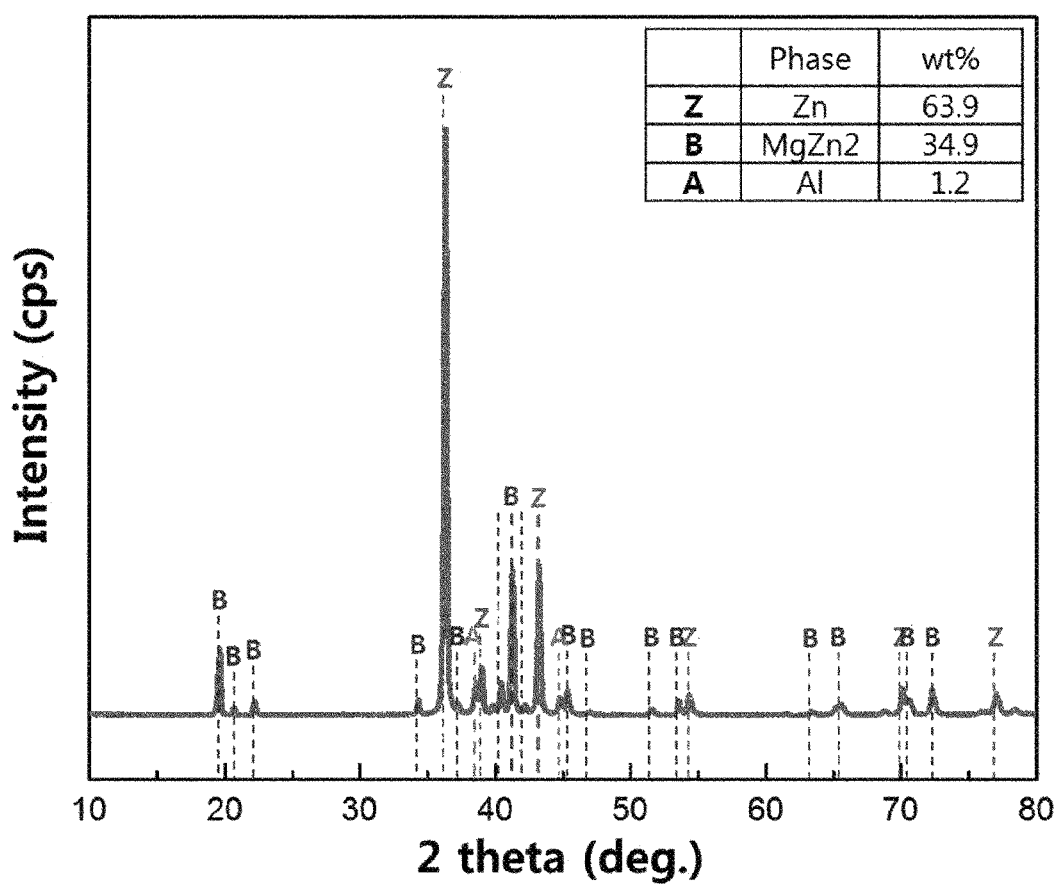

[FIG. 5]
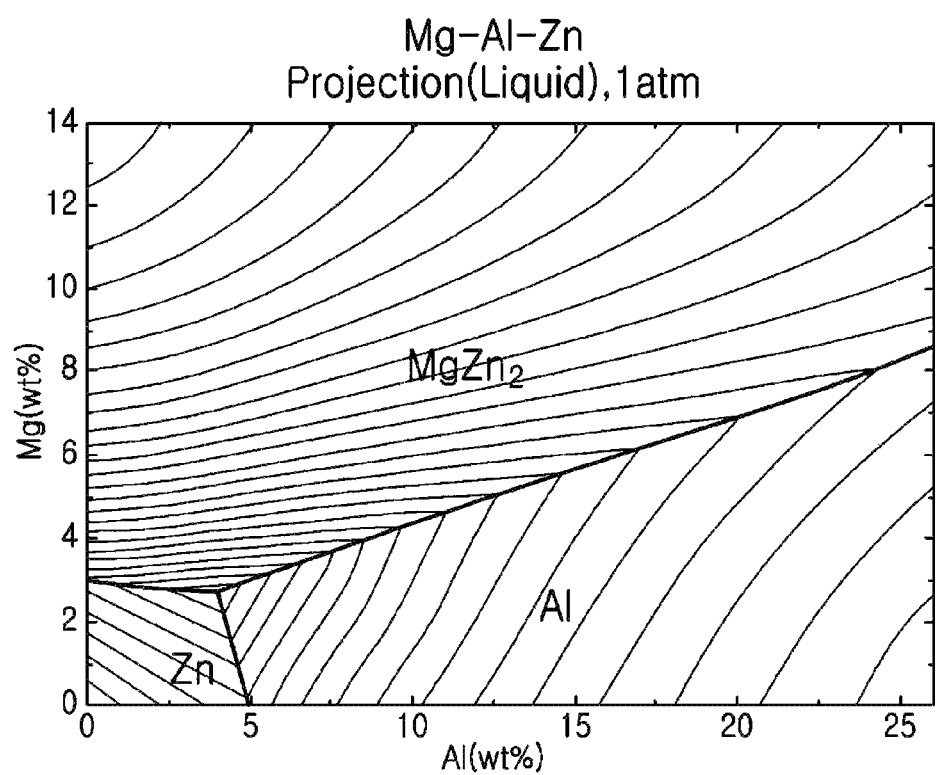

[FIG. 6]
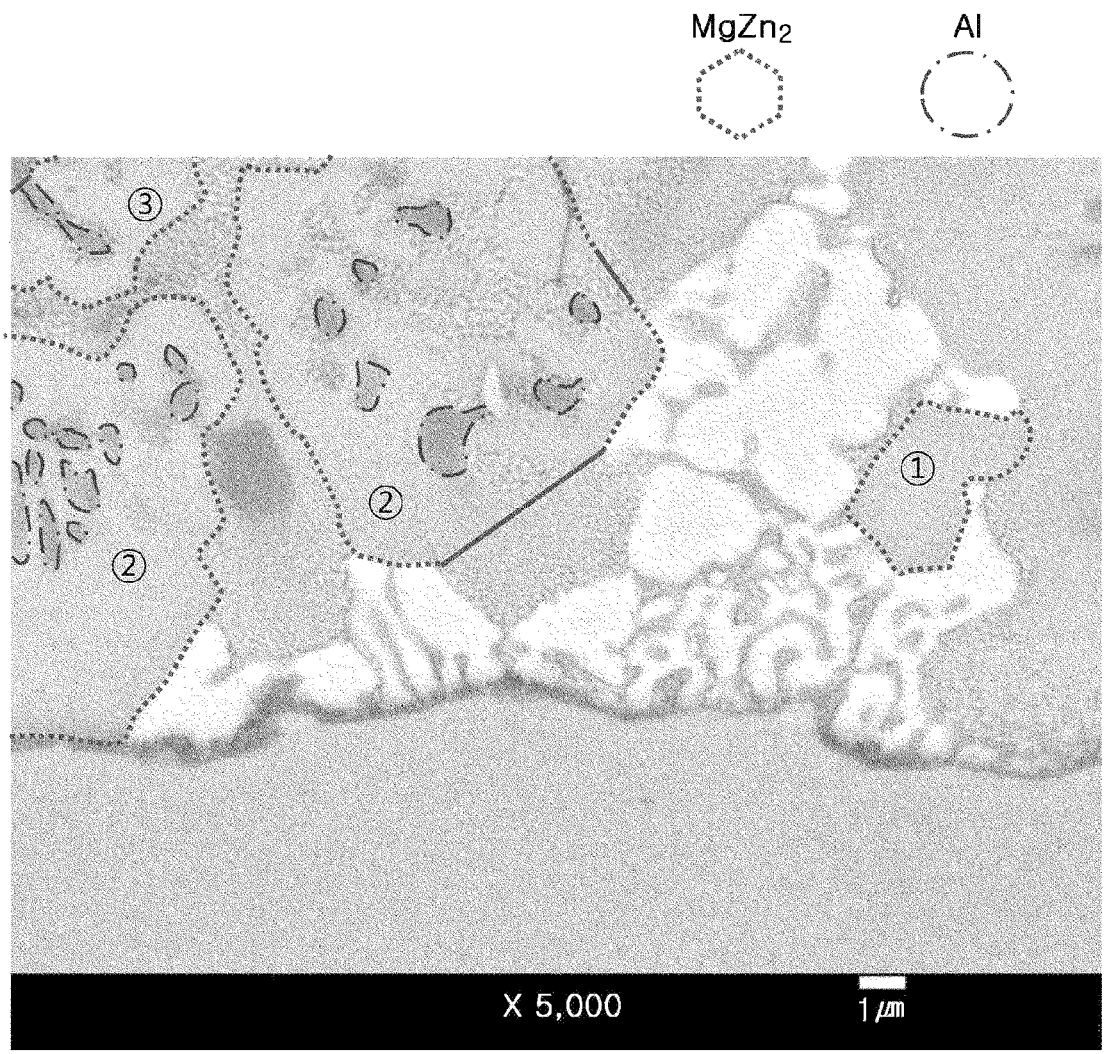

[FIG. 7]
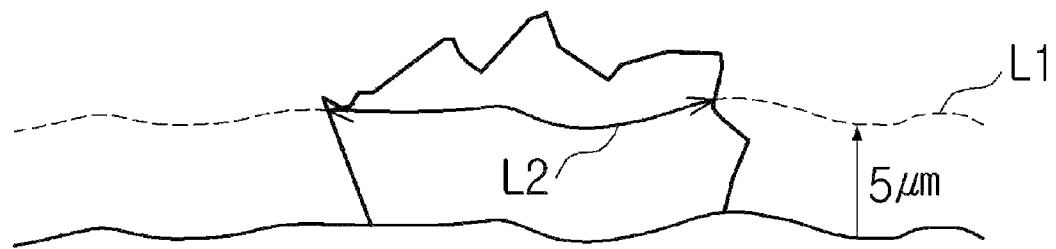
[FIG. 8]
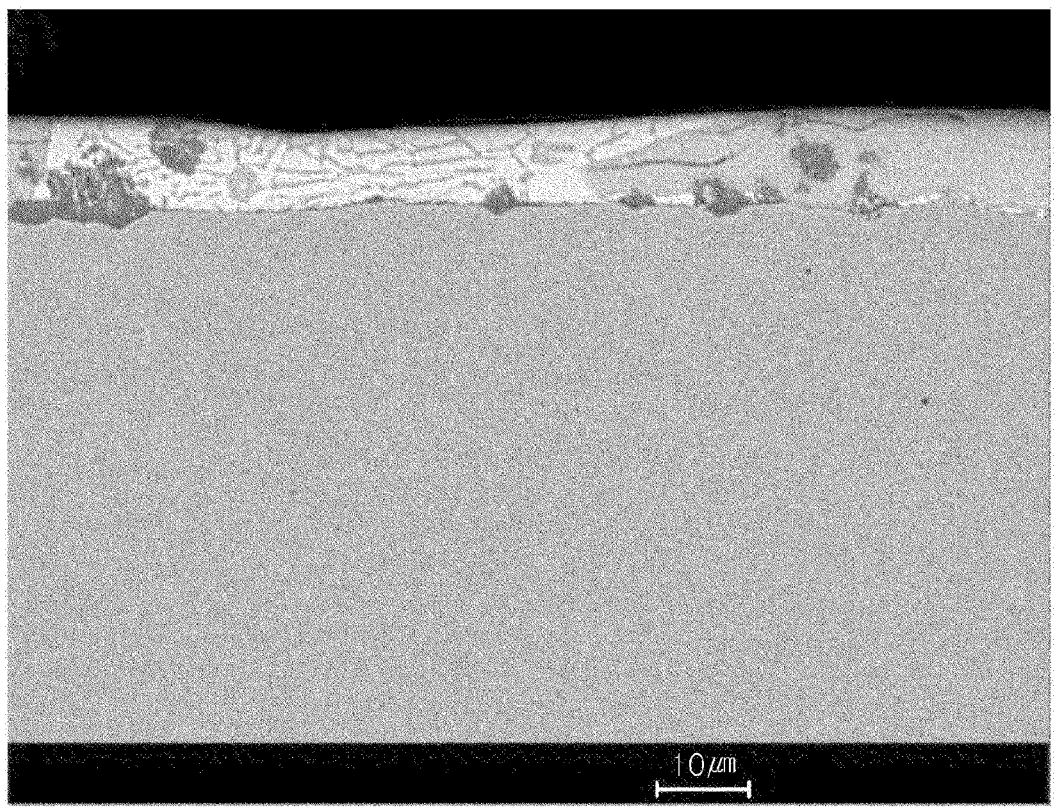

PLATED STEEL SHEET HAVING EXCELLENT CORROSION RESISTANCE, GALLING RESISTANCE, WORKABILITY AND SURFACE PROPERTY

CROSS-REFERENCE OF RELATED APPLICATIONS

This application is the U.S. National Phase under 35 U.S.C. § 371 of International Patent Application No. PCT/KR2020/012980, filed on Sep. 24, 2020, which in turn claims the benefit of Korean Application Nos. 10-2019-0117525, filed on Sep. 24, 2019 and 10-2020-0075328, filed on Jun. 19, 2020, the entire disclosures of which applications are incorporated by reference herein.

TECHNICAL FIELD

The present disclosure relates to a plated steel sheet having excellent corrosion resistance, galling resistance, workability, and surface quality, and a method for manufacturing the same.

BACKGROUND ART

A zinc-based plated steel sheet has a sacrificial characteristic in which, when it is exposed to a corrosive environment, zinc having a lower oxidation-reduction potential than iron corrodes first to suppress corrosion of a steel plate. In addition, as zinc in a plating layer is oxidized, a dense corrosion product is formed on the surface of a steel plate to block the steel plate from an oxidation atmosphere, thereby improving corrosion resistance of the steel plate. Due to the advantageous properties as such, the scope of application of the zinc-based plated steel sheet has been recently expanded to steel sheets for construction materials, home appliances, and automobiles.

However, due to an increase in air pollution caused by industrial advancement, a corrosive environment gradually deteriorates, and due to strict regulations of resource and energy conservation, there is a growing need for development of a steel plate having better corrosion resistance than a conventional zinc-based plated steel sheet.

In order to improve the problem, various studies for a manufacturing technology of a zinc-based plated steel sheet, by adding elements such as aluminum (Al) and magnesium (Mg) to a zinc plating bath to improve the corrosion resistance of a steel plate have been conducted. As a representative example, there is a Zn—Mg—Al-based zinc alloy plated steel sheet to which Mg is further added to a Zn—Mg—Al-based composition system.

In addition, as compared to a zinc-based plated steel sheet, the Zn—Mg—Al-based zinc plated steel sheet has excellent corrosion resistance and is favorable to suppression of galling in molding. Galling refers to a phenomenon in which a plating layer is partly peeled off, and then is cold pressure welded to a surface of a mold so that a new material penetrates into the mold and causes a scratch on a surface of the material when molded, or a plating layer pressure welded on the surface of the mold is peeled off due to fraction with the material during molding to peel off a part of a mold material also. Since the galling occurring when molding the plated steel sheet deteriorates surface quality of a product and has a significant influence on a mold life, it should be absolutely prevented.

There are various factors which affect the galling property. However, even in the case of setting an initial value on a surface of a plated steel sheet considering the factors, the initial setting value is changed at the time of press molding by inevitable friction due to the transfer and processing of the material, and thus, it is difficult to secure a desired level of galling resistance.

Meanwhile, a zinc-based plated steel sheet is commonly used in a processed state in many cases, and in the case of a Zn—Mg—Al-based zinc alloy plated steel sheet, a large amount of an intermetallic compound having a high hardness is included in the plating layer to deteriorate bending workability, such as causing cracks in the plating layer at the time of bending processing.

In addition, the zinc-based plated steel sheet after being processed is often provided outside a product, but the surface quality is inferior due to surface damage and the like by processing, and thus, it is necessary to improve outer sheet quality.

However, a technology to meet advanced demands for excellent corrosion resistance, galling resistance, workability, surface quality, and the like, has not been developed.

(Related Art Document) Korean Patent Laid-Open Publication No. 2013-0133358

DISCLOSURE

Technical Problem

An aspect of the present disclosure is to provide a plated steel sheet having excellent corrosion resistance, galling resistance, workability, and surface quality, and a method for manufacturing the same.

An object of the present disclosure is not limited to the above description. Any person with ordinary skill in the art to which the present disclosure pertains will have no difficulty in understanding further objects of the present disclosure from the descriptions throughout the specification of the present disclosure.

Technical Solution

According to an aspect of the present disclosure, a plated steel sheet includes:

a base steel sheet;

a Zn—Mg—Al-based plating layer provided on at least one surface of the base steel sheet; and a Fe—Al-based inhibition layer provided between the base steel sheet and the Zn—Mg—Al-based plating layer, wherein the plating layer includes, by weight: 4 to 10% of Mg and 5.1 to 25% of Al, with a balance of Zn and unavoidable impurities, based on components other than iron (Fe) diffused from the base steel sheet, the plating layer includes a $MgZn_2$ phase at a phase fraction of 24 to 50%, and an Al single phase is present inside the $MgZn_2$ phase at a ratio of 1 to 30% to a total cross-sectional area of the $MgZn_2$ phase.

According to another aspect of the present disclosure, a method for manufacturing a plated steel sheet includes:

shot blasting a surface of a base steel sheet to obtain a base steel sheet having a surface shape of 0.5 to 3.0 μm of Ra, 1 to 20 μm of RZ, and 10 to 1000 (count/cm) of Rpc;

dipping the base steel sheet having the surface shape in a plating bath which includes, by weight: 4 to 10% of Mg and 5.1 to 25% of Al, with a balance of Zn and unavoidable impurities and is maintained at 440 to 520° C. to plate the steel sheet with molten zinc; and cooling the steel sheet starting from a bath surface of the plating bath to a top roll section at an average cooling rate of 3 to 30° C./s using inert gas.

Advantageous Effects

As set forth above, according to an exemplary embodiment in the present disclosure, a plated steel sheet having excellent corrosion resistance, galling resistance, workability, and surface quality, and a method for manufacturing the same may be provided.

Various and beneficial merits and effects of the present disclosure are not limited to the descriptions above, and may be more easily understood in a process of describing specific exemplary embodiments in the present disclosure.

DESCRIPTION OF DRAWINGS

FIG. 1 is a 500× magnified photograph of a cross-section specimen, observed by a field emission scanning electron microscope (hereinafter, referred to as "FE-SEM"), the cross-section specimen being made in a thickness direction for a plated steel sheet of Example 1 so that an entire plating layer and base iron are observed together.

FIG. 2 is a 3,500× magnified photograph of across section of a plated steel sheet of Example 2, observed by a field emission scanning electron microscope (FE-SEM).

FIG. 3 is results of component mapping using an electron probe micro analyzer (EPMA) so that Mg and Al component distributions are shown.

FIG. 4 is an X-ray diffraction (hereinafter, referred to as "XRD") graph of a plating layer of Example 2 of the present disclosure.

FIG. 5 is a Mg—Al—Zn ternary phase diagram.

FIG. 6 is a 5,000× magnified photograph of across section of a plated steel sheet of Example 5, observed by a field emission scanning electron microscope (FE-SEM).

FIG. 7 is a drawing schematically showing a method of measuring a length occupied by an outburst phase.

FIG. 8 is a 1,000× magnified photograph of across section of a plated steel sheet of Comparative Example 9 of the present disclosure, observed by a field emission scanning electron microscope (FE-SEM).

BEST MODE FOR INVENTION

Terms used in the present specification are for explaining specific exemplary embodiments rather than limiting the present disclosure. In addition, a singular form used in the present specification includes a plural form also, unless the relevant definition has a clearly opposite meaning thereto.

The meaning of "comprising" used in the specification is to embody the configuration and is not to exclude the presence or addition of other configurations.

Unless otherwise defined, all terms including technical terms and scientific terms used in the present specification have the same meaning as would be commonly understood by a person with ordinary skill in the art to which the present disclosure pertains. Pre-defined terms are interpreted as being consistent with the relevant technical literature and the disclosure herein.

Hereinafter, the plated steel sheet according to an aspect of the present disclosure will be described in detail. A content of each element in the present disclosure is by wt %, unless otherwise particularly defined.

According to an exemplary embodiment in the present disclosure, a plated steel sheet includes a base steel sheet; a Zn—Mg—Al-based plating layer provided on at least one surface of the base steel sheet; and a Fe—Al-based inhibition layer provided between the base steel sheet and the Zn—Mg—Al-based plating layer.

In the present disclosure, the type of base steel sheet may not be particularly limited. For example, the base steel sheet may be a Fe-based base steel sheet used as the base steel sheet of a usual zinc-based plated steel sheet, that is, a hot rolled steel sheet or a cold rolled steel sheet, but is not limited thereto. Otherwise, the base steel sheet may be, for example, a carbon steel, an ultra-low carbon steel, or a high manganese steel, used as, for example, materials for construction, home appliances, and automobiles.

However, as a non-limiting example, the base steel sheet may have a composition including, by weight: 0.17% or less (0 exclusive) of C, 1.5% or less (0 exclusive) of Si, 0.01 to 2.7% of Mn, 0.07% or less (0 exclusive) of P, 0.015% or less (0 exclusive) of S, 0.5% or less (0 exclusive) of Al, 0.06% or less (0 exclusive) of Nb, 1.1% or less (0 inclusive) of Cr, 0.06% or less (0 exclusive) of Ti, and 0.03% or less (0 exclusive) of B, with a balance of Fe and other unavoidable impurities.

According to an exemplary embodiment in the present disclosure, a Zn—Mg—Al-based plating layer formed of a Zn—Mg—Al-based alloy may be provided on at least one surface of the base steel sheet. The plating layer may be formed on only one surface of the base steel sheet or may be formed on both surfaces of the base steel sheet. Here, the Zn—Mg—Al-based plating layer refers to a plating layer including Mg and Al and 50% or more of Zn.

In addition, according to an exemplary embodiment in the present disclosure, a Fe—Al-based inhibition layer may be provided between the base steel sheet and the Zn—Mg—Al-based plating layer. The Fe—Al-based inhibition layer is a layer including an intermetallic compound of Fe and Al, and the intermetallic compound may include FeAl, $FeAl_3$, $Fe_2Al_5$, and the like. Besides, some components, for example, 40% or less of components derived from the plating layer, such as Zn and Mg, may be further included. The inhibition layer is a layer formed by alloying of Fe diffused from the base steel sheet at the beginning of plating and plating bath components. The inhibition layer serves to improve close adhesion between the base steel sheet and the plating layer, and also to block Fe diffusion from the base steel sheet to the plating layer.

According to an exemplary embodiment in the present disclosure, the plating layer may include, by weight: 4 to 10% of Mg and 5.1 to 25% of Al, with a balance of Zn and unavoidable impurities, based on components other than iron (Fe) diffused from the base steel plate.

Mg: 4 to 10%

Mg is an element serving to improve corrosion resistance of a plated steel plate, and in the present disclosure, the content of Mg in the plating layer is controlled to be 4% or more, for securing a desired level of excellent corrosion resistance. Meanwhile, in Zn—Mg—Al ternary alloy plating, Mg is known as an auxiliary role to further stabilize formation of a corrosion product of Zn, but when the content of Mg is more than 10%, a rate at which Mg corrodes itself is higher than a rate at which Mg stabilizes the corrosion product of Zn, and thus, may be rather a factor to deteriorate the corrosion resistance of the plated steel sheet. Therefore, Mg may be controlled to 10% or less, and more preferably 7% or less in the present disclosure.

Al: 5.1 to 25%

In general, when Mg is added at 1% or more, an effect of improving corrosion resistance is exhibited, but when Mg is added at 2% or more, a plating bath floating dross occurrence by oxidation of Mg in the plating bath is increased, so that the dross should be removed often. Due to the problem, in the conventional technology, in Zn—Mg—Al-based zinc alloy plating, Mg is added at 1.0% or more to secure corrosion resistance, while the upper limit of the Mg content is set to 3.0%.

However, as described above, in order to further improve corrosion resistance, it is necessary to increase the content of Mg to 4% or more, but when Mg is included at 4% or more in the plating layer, dross occurs by oxidation of Mg in the plating bath.

In order to suppress dross occurrence as such, the content of Al in the plating layer is included at preferably 5.1% or more, and more preferably 10.50% or more. However, when Al is excessively added for dross suppression, a melting point of the plating bath is raised and an operating temperature is accordingly too high, thereby causing a problem by high temperature operation, such as erosion of a plating bath structure and deformation of a steel plate. Besides, when an Al content in the plating bath is too high, Al reacts with Fe in the base iron and does not contribute to the formation of a Fe—Al inhibition layer, and rapidly increase a reaction contributing to the formation of an outburst phase, thereby excessively forming an outburst phase in a lump shape to deteriorate corrosion resistance. Therefore, the upper limit of the Al content in the plating layer may be controlled to preferably 25%, and more preferably 21.50%.

The Al and Mg contents may be determined to be positioned in the vicinity of a two processes line of $MgZn_2$ and Al, in a Mg—Al—Zn ternary phase diagram. Here, being determined to be positioned in the two processes line includes not only the case of being determined to be positioned precisely in the two processes line, but also the case of being determined to be positioned within Mg=±0.5 wt % and Al=±1 wt %, based on the two processes line, slightly out of the two processes line. FIG. 5 shows a Mg—Al—Zn ternary phase diagram when the X-axis is an Al content and the Y-axis is a Mg content. In FIG. 5, A represents the conditions corresponding to an example of the present disclosure, and as shown in FIG. 5, the Al and Mg contents may be determined to be positioned in the vicinity of the two processes line of $MgZn_2$ and Al in the Mg—Al—Zn ternary phase diagram.

Balance of Zn and Other Unavoidable Impurities

A balance other than the composition of the plating layer described above may be Zn and other unavoidable impurities. The unavoidable impurities may include any impurities as long as they may be incorporated unintentionally in the manufacturing process of a common molten zinc plated steel sheet, and a person skilled in the art may easily understand the meaning.

Since a small amount of an iron (Fe) component may be diffused from the base steel sheet into the plating layer and included in a small amount in the plating layer, and the content of the iron component included in the plating layer is in an extremely small amount, the amount corresponds to an impurity level and may not be separately defined.

Meanwhile, when Fe in the base steel sheet is diffused to the plating layer, it is alloyed or produces an intermetallic compound, thereby forming an outburst phase to form the inhibition layer discontinuously. However, since the outburst phase is a factor which reduces corrosion resistance, it is preferred in the present disclosure that the inhibition layer is continuously formed, based on a cut surface of the plated steel sheet (in a direction perpendicular to the rolling direction of the steel sheet). That is, the inhibition layer being continuously formed means that the outburst phase is not formed.

However, an amount of Fe may be diffused from the base steel sheet to the plating layer and form the outburst phase which is an alloy phase between the base steel sheet and the plating layer.

Therefore, though the outburst phase is formed in the present disclosure, in terms of securing corrosion resistance, when an interface line of the base steel sheet is spaced 5 μm apart toward the surface of the plating layer, in the cut surface in the thickness direction of the steel sheet, it is necessary for a length occupied by the outburst phase intersecting the spaced line to be 10% or less, and more preferably 8% or less of the length of the spaced line. Here, a line drawn along the interface formed by the layer in contact with the base steel sheet is referred to as an interface line.

A method of measuring the length occupied by the outburst phase is schematically shown in FIG. 7. As shown in FIG. 7, L1 represents a length of the spaced line, and L2 represents a length occupied by the outburst phase intersecting the spaced line.

Therefore, the measurement method of FIG. 7 described above may be applied as it is to measure the length occupied by the outburst phase, with FIG. 8 which is a 1000× magnified photograph of a cross-section specimen in the thickness direction of the plated steel sheet of Comparative Example 9 described below of the present disclosure, taken by FE-SEM, as an example.

As a result, it is preferred in the present disclosure that the inhibition layer is continuously formed, and even in the case in which the inhibition layer is discontinuously formed, it is preferred that the inhibition layer is formed so that it occupies 90% or more of the total interface length of the base steel sheet and the inhibition layer. For example, an interface length and a length ratio therefrom may be measured at a magnification of the scanning electron microscope of 1,000 times, and include the case of being observed in at least one of three random points measured.

According to an exemplary embodiment in the present disclosure, the content of Fe in the outburst phase is 10 to 45% by weight, the alloy phase of the outburst phase includes one or more of $Fe_2Al_5$, FeAl, and Fe—Zn-based phases, and Zn may be included at 50% by weight or more.

According to an exemplary embodiment in the present disclosure, the inhibition layer may have a thickness of 0.02 μm or more and 2.5 μm or less. The inhibition layer serves to prevent alloying to secure corrosion resistance, but since it is brittle, it has an adverse effect on workability, and thus, the thickness may be controlled to 2.5 μm or less. However, in order to act as the inhibition layer, it is preferred that the thickness is controlled to 0.02 μm or more. Here, the thickness of the inhibition layer may refer to a minimum thickness in a direction perpendicular to the interface using SEM and TEM devices.

However, in the present disclosure, as the case of discontinuously forming the inhibition layer, the inhibition layer and the outburst phase may coexist in the interface of the base steel sheet. That is, the outburst phase includes an area intersecting the line moving 5 μm in parallel from the interface, as described above, and may be to a part where the area is in contact with the interface of the base steel sheet. However, the alloy layer including the Fe—Al-based intermetallic compound other than the outburst phase is regarded as being a inhibition layer.

Meanwhile, the plating layer may include a $MgZn_2$ phase at a phase fraction of 24 to 50%. Here, the phase fraction of the $MgZn_2$ phase may be measured by converting a relative weight ratio obtained by calculating a diffraction peak integral intensity of each phase measured from X-ray diffraction (XRD). The instrument used in measuring the specimen of the present disclosure is Rigaku D/Max 2200. In addition, the relative weight ratio may be verified using Rietveld measurement and a phase diagram calculation program which is a precise phase fraction measurement method.

The plating layer including a $MgZn_2$ phase at a phase fraction of 24 to 50% results from the contents of Al and Mg in the plating bath, and for example, when the content of Mg is less than 4.0%, less than 24% of the $MgZn_2$ phase may be produced. Since the $MgZn_2$ phase has a higher hardness than a structure formed of other alloy phases, the phase fraction of the $MgZn_2$ phase may be controlled to adjust the hardness of the plating layer. When the phase fraction of the $MgZn_2$ phase is less than 24%, the hardness of the plating layer is less than 220 Hv, and the repeated friction coefficient of 30 times is increased significantly. Meanwhile, the $MgZn_2$ phase fraction in the plating layer may be in a range of more preferably 24 to 49.0%.

However, when the phase fraction of the $MgZn_2$ phase is more than 50%, the $MgZn_2$ phase having a high hardness in the plating layer is non-uniform and coarsely aggregated. Therefore, a Zn single phase and a Zn—Al—$MgZn_2$ ternary process structure which secure uniform workability is not evenly distributed, so that cracks may occur at the time of processing, and corrosion may be easily propagated by cracks to rapidly decrease corrosion resistance.

As such, by controlling the phase fraction of the $MgZn_2$ phase in the plating layer in a range of 24 to 50%, the hardness of the plating layer which is one of the factors affecting galling resistance in terms of the physical properties of materials may be controlled in an appropriate range.

Meanwhile, as seen in the Mg—Al—Zn ternary phase diagram in FIG. 5, a solidification initiation composition of a plating structure in the present disclosure may be positioned in the two processes line of $MgZn_2$ and Al. Thus, the plating layer according to the present disclosure may represent a characteristic that the Al single phase is included in the $MgZn_2$ phase. In this regard, FIGS. 1, 2, and 3 are photographs of the cross section of the plated steel sheet of Example 2 in Table 2, which is a preferred exemplary embodiment in the present disclosure, observed by a field emission scanning electron microscope (hereinafter, referred to as "FE-SEM") (magnification: 500 times to 3,500 times), and component mapping results to show Mg and Al component distribution using an electron probe micro analyzer (EPMA). As seen in FIGS. 2 and 3, it may be confirmed that the Al single phase is included in $MgZn_2$ in the plating layer.

In general, a unique plating structure shape called spangle is easy to appear in the plated steel sheet. The spangle occurs due to the characteristic of the solidification reaction of zinc. That is, when zinc is solidified, a dendrite in the form of a branch grows starting from a solidification nucleus to form a skeleton of a plating structure, and an unsolidified molten zinc pool remaining in the dendrite is finally solidified to finish solidification of the plating layer. In the case in which, unlike the present disclosure, Al is separated from $MgZn_2$ and formed into a primary crystal structure, the Al primary crystal structure grows into a dendrite form, and the Al dendrite form is more severe as a plating amount is larger and a solidification rate is lower. When the Al primary crystal structure in the dendrite form as such grows too large, bending of the plating layer is severe and has an adverse effect on surface appearance. Accordingly, Al having good oxidative reactivity may be excessively exposed to the surface to deteriorate the oxidative stability of the plated steel sheet.

In the present disclosure, the Al single phase may be present inside the $MgZn_2$ phase at a ratio of 1 to 30% to the total cross-sectional area of the $MgZn_2$ phase.

Here, the Al single phase included inside the $MgZn_2$ phase refers to not only an Al single phase completely included inside the $MgZn_2$ phase, but also an Al single phase which is partially included inside the $MgZn_2$ phase.

Meanwhile, a method of measuring the Al single phase which is partially included inside the $MgZn_2$ phase is shown in FIGS. 2, 3, and 6. Specifically, two points of contact where a boundary line of an Al phase (or other phases surrounding the Al phase) and a boundary line of a $MgZn_2$ phase meet are connected in a straight line, thereby calculating the area occupied by the Al single phase inside the $MgZn_2$ phase.

That is, the $MgZn_2$ and the Al single phase in the shape in FIG. 2 may be distinguished, and also may be confirmed again by the component mapping results in FIG. 3. Thus, the total fraction of the $MgZn_2$ phase in the plating structure may be determined, and the fraction of only Al inside $MgZn_2$ or on $MgZn_2$ may be separately determined. The area fraction occupied by the Al single phase in the $MgZn_2$ phase may be calculated as a numerical data determined as such.

In addition, FIG. 6 is a 5,000× magnified photograph of a cross section of the plated steel sheet, observed by a field emission scanning electron microscope (referred to as "FE-SEM"). Here, an area of ① shows that only $MgZn_2$ is present, an area of ② shows that the Al single phase is included in $MgZn_2$, and an area of ③ shows that a portion of the Al single phase is included inside the $MgZn_2$ phase and the other portion protrudes out of the $MgZn_2$ phase.

That is, according to an exemplary embodiment in the present disclosure, the Al single phase may be entirely or partially positioned inside the $MgZn_2$ phase.

In the common manufacturing process of the plated steel sheet, a dense coat is formed by an ionization reaction of Mg and Zn, and the $MgZn_2$ phase may be present in a lump form. However, when the phase fraction of the Al single phase to the $MgZn_2$ phase is less than 1%, a $MgZn_2$ lump may selectively corrode, and an ionization material is released by a rapid initial ionization reaction to produce pores.

Therefore, by securing the phase fraction of the Al single phase to the $MgZn_2$ phase in the plating layer of 1% or more, the Al single phase serves as a skeleton in the plating layer structure, and thus, appropriately adjusts the ionization rate of Mg to maintain the mechanical structure, thereby securing excellent corrosion resistance. That is, the Al single phase is not eluted in a corrosive environment and retains its original shape as compared with a $MgZn_2$ phase, a binary phase, or a ternary phase, and does not have a dense structure as compared with other corrosion products. Therefore, when corrosion is in progress a lot so that the plating layer is all formed into a corrosion product, the Al single phase serves to densify the corrosion product and retain the skeleton. Therefore, the Al single phase may be expected to play a role in retaining the skeleton only when it is maintained at 1% or more.

However, when the phase fraction of the Al single phase to the $MgZn_2$ phase in the plating layer is more than 30%, the corrosion product is densified by the Al single phase, so that an effect of blocking an external corrosive environment and an effect of retaining a skeleton are good, but a decomposition rate of $MgZn_2$ is decreased, and since the Al single phase has no sacrificed protection, the sacrificed protection of the plating layer may be decreased. In addition, since the Al single phase has low hardness as compared with other phases in the plating layer, the friction coefficient of the plating layer may be increased. Besides, in this case, the size of $MgZn_2$ crystals including the Al single phase in common in many observation examples may relatively coarsely grow. In this case, the coarsened $MgZn_2$—Al process structure causes surface non-uniformity to deteriorate appearance quality, and stress may be concentrated herein at the time of processing to cause damage. Therefore, preferably, the phase fraction of the Al single phase may be in a range of 1 to 15%, in terms of surface quality and processing cracks, and more preferably, the lower limit of the phase fraction of the Al single phase may be 2% and the upper limit of the phase fraction of the Al single phase may be 9%.

According to an exemplary embodiment in the present disclosure, the Al single phase included inside the $MgZn_2$ phase may correspond to one of the following cases:
an Al single phase included inside the $MgZn_2$ phase and completely surrounded by the $MgZn_2$ phase,
an Al single phase which is partially included inside the $MgZn_2$ phase and partially protrudes out of the $MgZn_2$ phase.

Meanwhile, the Al single phase referred in the present disclosure means a single phase having Al as a main body, and may include Zn and other components eluted in the phase. According to an exemplary embodiment in the present disclosure, the Al single phase may include, by weight: 40 to 70% of Al and 30 to 55% of Zn, with other unavoidable impurities. Otherwise, the Al single phase may include, by weight: 40 to 70% of Al and 30 to 55% of Zn, with other unavoidable impurities, the total content of An and Zn being 95 to 100%. Here, the balance may be Mg, but it means that an error range from which a Mg component included in the plating layer around the Al phase is detected is included.

According to an exemplary embodiment in the present disclosure, a ratio of the Al single phase in the plating layer may be 1 to 15% as a phase fraction. When the ratio of the Al single phase in the plating layer is 1% or more, the plating layer may contribute to a role as a physical protective barrier by Al functioning to retain a skeleton. However, when the ratio of the Al single phase in the plating layer is 15% or less, the sacrificed protection of the plating layer being deteriorated and the friction properties of the plating layer being decreased may be prevented.

In addition, according to an exemplary embodiment in the present disclosure, the $MgZn_2$ phase is exposed to at least a portion of the surface of the plating layer, and an average circle-equivalent diameter of the $MgZn_2$ phase exposed to the surface may be 5 to 50 μm. Here, the average circle-equivalent diameter may be defined as a diameter of a virtual circle, when the virtual circle having the same area as the cross-sectional area of the $MgZn_2$ phase observed on the surface of the plated steel sheet is set. By controlling the $MgZn_2$ phase having high hardness, exposed to the surface of the plating layer, a friction coefficient may be adjusted, and when the average circle-equivalent diameter of the $MgZn_2$ phase is 5 to 50 μm, the $MgZn_2$ phase structure is entirely evenly exposed to the surface of the plating layer, so that a low friction coefficient to be desired in the present disclosure may be obtained.

Meanwhile, according to an exemplary embodiment in the present disclosure, the plating layer, which is a microstructure, may further include a Zn—Al—$MgZn_2$ ternary process structure, a Zn—$MgZn_2$ binary process structure, a Zn—Al mixed structure, and a Zn single phase structure.

According to an exemplary embodiment in the present disclosure, the phase fraction of the Al—Zn binary process phase present in the $MgZn_2$ phase of the plating layer may be 10 to 45%, and more preferably 10.0 to 43.0%. The Al—Zn binary process phase present in the $MgZn_2$ phase serves to decrease cracks occurring in the $MgZn_2$ crystal phase from stress occurrence. When the phase fraction of the Al—Zn binary process phase present in the $MgZn_2$ phase in the plating layer is less than 10%, the crack reduction effect may be insignificant, and when the phase fraction is more than 45%, formation of the Al single phase is decreased to be unfavorable to corrosion resistance.

Here, the Al—Zn binary process phase described above means that the Al and Zn single phases are arranged while showing alternating lamella or irregular mixed shapes, and it should be noted that Al in the binary process phase is not regarded as being a single phase.

The plated steel sheet according to an exemplary embodiment in the present disclosure has a plating layer formed of the alloy composition and the microstructure described above, thereby securing better properties of one or more of corrosion resistance, workability, galling resistance, and surface properties, as compared with a conventional zinc-based plated steel sheet containing about 3.0% or less of Mg.

According to an exemplary embodiment in the present disclosure, a surface roughness (Ra) of the plating layer may be 0.5 to 2.0 μm.

According to an exemplary embodiment in the present disclosure, the plating layer may have a cross-sectional hardness in a range of 220 to 450 Hv, and more preferably 220 to 420 Hv.

In addition, according to an exemplary embodiment in the present disclosure, the plated steel sheet may have a friction coefficient of 1.5 or less, and a low repeated friction coefficient at a level of 0.5 to 1.4, the repeated friction coefficient being measured by using a high-speed rotational friction testing machine to perform a repeated test 30 times or more, and more preferably, the lower limit of the repeated friction coefficient may be 0.7 and the upper limit of the repeated friction coefficient may be 1.4.

Meanwhile, according to an exemplary embodiment in the present disclosure, the inhibition layer may have a thickness of 0.02 μm or more and 2.5 μm or less. The inhibition layer serves to prevent alloying to secure corrosion resistance, but since it is brittle, it has an adverse effect on workability, and thus, the thickness may be controlled to 2.5 μm or less. However, in order to act as the inhibition layer, it is preferred that the thickness is controlled to 0.02 μm or more. Otherwise, the lower limit of the thickness of the inhibition layer may be 0.05 μm and the upper limit of the thickness of the inhibition layer may be 1.1 μm.

However, in the present disclosure, the inhibition layer and the outburst phase may coexist in the interface of the base steel sheet. That is, the outburst phase refers to an area intersecting the line moving 5 μm in parallel from the interface, as described above, and may be to a part where the area is in contact with the interface of the base steel sheet. However, the interface alloy layer other than the outburst phase may be regarded as being the inhibition layer.

In addition, according to an exemplary embodiment in the present disclosure, the inhibition layer may be formed of a Fe—Al-based intermetallic compound including less than 40% of Zn. Here, the Fe—Al-based intermetallic compound of the inhibition layer may be formed of one or more of $Fe_2Al_5$, $FeAl_3$, and $FeAl_5$.

Next, the method for manufacturing a plated steel sheet according to an exemplary embodiment in the present disclosure will be described in detail. However, it does not mean that the plated steel sheet of the present disclosure should be necessarily manufactured by the following manufacturing method.

According to an exemplary embodiment in the present disclosure, a process of preparing a base steel sheet may be further included, and the type of base steel sheet is not particularly limited. It may be a Fe-based base steel sheet used as the base steel sheet of a usual molten zinc plated steel sheet, that is, a hot rolled steel sheet or a cold rolled steel sheet, but is not limited thereto. In addition, the base steel sheet may be, for example, carbon steel, ultra-low carbon steel, or high-manganese steel used as automotive materials, but is not limited thereto.

Next, according to an exemplary embodiment in the present disclosure, a process of dipping a base steel sheet in a plating bath which includes, by weight: 4 to 10% of Mg and 5.1 to 25% of Al, with a balance of Zn and unavoidable impurities to plate the steel sheet with molten zinc may be included. In order to prepare the plating bath having a composition described above, a composite ingot containing predetermined Zn, Al, and Mg, or a Zn—Mg or Zn—Al ingot containing separate components may be used. Meanwhile, the components of the plating bath may be as described for the components of the plating layer described above except the content of Fe introduced from the base steel sheet.

In addition, according to an exemplary embodiment in the present disclosure, dissolution is performed while the temperature of the plating bath may be maintained at 440 to 520° C. As the temperature of the plating bath is higher, it is possible to secure flowability in the plating bath and form a uniform composition, and a floating dross occurrence amount may be decreased. When the temperature of the plating bath is lower than 440° C., the dissolution of the ingot is very slow and the viscosity of the plating bath is high, so that it may be difficult to secure excellent surface quality of the plating layer. However, when the temperature of the plating bath is higher than 520° C., ashy defects by Zn evaporation may be caused on the plating surface, and diffusion of Fe may be excessively progressed to excessively form an outburst phase. That is, when an interface line of the layer in contact with the base steel sheet described above is spaced 5 μm apart toward the surface of the plating layer, a length occupied by the outburst phase intersecting the spaced line may be more than 10% of a length of the spaced line, resulting in corrosion resistance reduction. Here, the temperature of the plating bath may be maintained at a temperature higher than the melting point of the plating bath by 20 to 80° C.

According to an exemplary embodiment in the present disclosure, a bathing time after dipping the base steel sheet in the plating bath may be in a range of 1 to 6 seconds.

In addition, according to an exemplary embodiment in the present disclosure, a process of cooling the steel sheet starting from a bath surface of the plating bath to a top roll section at an average cooling rate of 3 to 30° C./s using inert gas may be further included. Here, when the cooling rate from the bath surface of the plating bath to the top roll section is less than 3° C./s, the $MgZn_2$ structure is developed too coarsely to bend the surface of the plating layer severely. In addition, the Zn—$MgZn_2$ binary or Al—Zn—$MgZn_2$ ternary process structure is formed broadly, so that it may be unfavorable to secure uniform corrosion resistance and workability. However, when the cooling rate from the bath surface of the Plating bath to the top roll section is more than 30° C./s, a liquid phase is started to solidify into a solid phase during a melting plating process and rapidly solidified in the temperature section in which the liquid phase is all changed into a solid phase, and thus, the size of the $MgZn_2$ structure is formed too small, resulting in locally uneven corrosion resistance. In addition, due to lack of uniform growth of the Fe—Zn—Al phase, workability may be deteriorated, with a focus on the interface of the plating layer and the base steel sheet, and an amount of nitrogen used is increased for an excessive cooling rate to increase manufacturing costs.

According to an exemplary embodiment in the present disclosure, the inert gas may include one or more of $N_2$, Ar, and He, and in terms of reducing manufacturing costs, it is preferred to use $N_2$ or $N_2$+Ar.

According to an exemplary embodiment in the present disclosure, a shot blast treatment is performed on the surface of the base steel sheet before plating to remove oxides on the surface. By the shot blast treatment, a process of allowing the base steel sheet to have a surface shape of 0.5 to 3.0 μm of Ra, 1 to 20 μm of Rz, and 10 to 100 (count/cm) of Rpc.

According to an exemplary embodiment in the present disclosure, by controlling the base steel sheet to have a surface shape of 0.5 to 3.0 μm of Ra, 1 to 20 μm of Rz, and 10 to 100 (count/cm) of Rpc, the reactivity on the surface of the base steel sheet is activated, so that a solidification nucleation may be more uniform at the time of solidification of the plating layer. Therefore, a plated steel sheet having excellent surface quality may be obtained, and also, a starting point of cracks is prevented from forming locally when processing by forming a uniform structure on the surface, thereby securing excellent workability.

In addition, according to an exemplary embodiment in the present disclosure, a diameter of the metallic ball used in the shot blast treatment is 0.3 to 10 μm, a moving speed of the steel sheet is controlled to 50 to 150 mpm (meter per minute), or the metallic ball at 300 to 3,000 kg/min is controlled to collide with the surface of the steel sheet.

That is, according to an exemplary embodiment in the present disclosure, the shot blast treatment may be performed by colliding a metallic ball at 300 to 3,000 kg/min with the surface of the steel sheet moving at a moving speed of 50 to 150 mpm, the metallic ball used having a diameter of 0.3 to 10 μm.

According to an exemplary embodiment in the present disclosure, a shot blast treatment is performed before plating the base steel sheet so that the base steel sheet before plating meets the conditions described above, thereby introducing a mechanical potential before surface plating to activate the surface of the base steel sheet so that the inhibition layer is rapidly and uniformly formed or solidification nucleation is more uniformly formed at the time of solidification of the plating layer.

That is, the conditions described above is met at the time of the shot blast treatment, thereby preventing the problem that the structure is roughly formed with the harsh shot blast treatment to deteriorate workability, or the activation degree of the surface of the base steel sheet before plating is low by the insufficient shot blast treatment to decrease the uniformity of the surface.

Therefore, the shot blast treatment is performed on the base steel sheet before plating and the treatment conditions of the shot blast is optimized, thereby easily manufacturing the plated steel sheet meeting one or more conditions of Ra, Rz, a cross-sectional hardness, and a thickness of the plating layer in the specific range described above.

MODE FOR INVENTION

Examples

Hereinafter, the present disclosure will be specifically described through the following Examples. However, it should be noted that the following examples are only for describing the present disclosure by illustration, and not intended to limit the right scope of the present disclosure. The reason is that the right scope of the present disclosure is determined by the matters described in the claims and reasonably inferred therefrom.

Experimental Example 1

A base steel sheet having a composition of 0.025% of C, 0.03% of Si, 0.15% of Mn, 0.01% of P, 0.003% of S, and 0.03% of Al, with a balance of Fe and other unavoidable impurities was shot blasted so that Ra, Rz, and Rpc of the base steel sheet before plating had the values of the following Table 1. Subsequently, a plating bath having the composition, melting point, and temperature of the following Table 1 was prepared, and the base steel sheet which was shot blasted was dipped in the plating bath so that the conditions of Table 1 were met to obtain the melted and plated steel sheet. The melted and plated steel sheet obtained as such was cooled from a bath surface of the plating bath to a top roll section so that the cooling rates described in the following Table 1 were met, using inert gas in a part of the cooling section.

The following Table 2 shows the measurement values described above and the experimental results evaluated based on the following criteria, for each of the examples and the comparative examples.

<Corrosion Resistance>

In order to evaluate corrosion resistance, a salt spray tester was used to perform evaluation according to the following criteria, by the testing method in accordance with ISO14993.

◎: a time taken for red rust to occur was more than 30 times that of a Zn plating having the same thickness.

○: a time taken for red rust to occur was 20 to 30 times that of a Zn plating having the same thickness.

Δ: a time taken for red rust to occur was 10 to 20 times that of a Zn plating having the same thickness.

x: a time taken for red rust to occur was less than 10 times that of a Zn plating having the same thickness.

<Uniformity>

In order to evaluate uniformity, the cross section of the plating layer was taken in a black scattering mode (BSI) using an SEM device to identify a phase in the plating layer. Random five points were taken with a length of 600 μm, and the length of the section where the MgZn$_2$ crystal having a

TABLE 1

| No. | Ra [μm] | Rz [μm] | Rpc [count/cm] | Plating bath composition (wt %) Mg | Al | Zn | Plating bath melting point [° C.] | Plating bath temperature [° C.] | Plating bath dipping time [s] | Average cooling rate [° C./s] | Inert gas type |
|---|---|---|---|---|---|---|---|---|---|---|---|
| A | 0.5 | 3 | 95 | 4.1 | 10.5 | 85.4 | 409 | 460 | 2 | 28 | N$_2$ |
| B | 1.2 | 5 | 45 | 5.2 | 12.5 | 82.3 | 423 | 480 | 4 | 8 | N$_2$ |
| C | 2.2 | 15 | 50 | 6 | 16 | 78 | 437 | 490 | 5 | 5 | N$_2$ |
| D | 2.7 | 19 | 15 | 7 | 21 | 72 | 454 | 510 | 6 | 4 | N$_2$ + Ar |
| E1 | 0.7 | 4 | 25 | <u>3.7</u> | 11.5 | 84.8 | 419 | 490 | 4 | 10 | N$_2$ |
| E2 | 0.9 | 7 | 34 | <u>12</u> | 24 | 64 | 493 | 520 | 4 | 13 | N$_2$ |
| F1 | 1.1 | 7 | 25 | 4.1 | <u>5</u> | 90.9 | 403 | 480 | 5 | 4 | N$_2$ |
| F2 | 1 | 8 | 45 | 5 | <u>27.5</u> | 67.5 | 485 | 520 | 6 | 2.5 | N$_2$ |
| G1 | 1.5 | 12 | 46 | 4.5 | 11.7 | 83.8 | 416 | <u>435</u> | 7 | 3 | N$_2$ |
| G2 | 2.1 | 14 | 75 | 5.6 | 14.5 | 79.9 | 430 | <u>530</u> | 6 | 33 | N$_2$ |
| H1 | 2.5 | <u>21</u> | 45 | 4.7 | 12.5 | 82.8 | 421 | <u>470</u> | 3 | 27 | N$_2$ |
| H2 | <u>0.4</u> | <u>7</u> | 25 | 5.5 | 13.8 | 80.7 | 429 | 480 | 4 | 12 | N$_2$ |
| I | <u>0.4</u> | 12 | 34 | 4 | 8 | 88 | 395 | 460 | 4 | 15 | N$_2$ |
| J | <u>2.1</u> | <u>21</u> | 45 | 5 | 15 | 85 | 435 | 500 | 4 | 7 | N$_2$ |

The plated steel sheet manufactured by the method of Table 1 was produced into a cross-section specimen so that the entire plating layer and the base steel sheet were observed together. The cross-section specimen was observed by SEM and TEM to confirm that a Zn—Al—Mg-based plating layer was formed on the base steel sheet, and a Fe—Al-based inhibition layer was formed between the base steel sheet and the Zn—Mg—Al-based plating layer.

Meanwhile, the composition of the plating layer of the plated steel sheet described above was dissolved in a hydrochloric acid solution, and the dissolved solution was analyzed by wet analysis (ICP) to measure the contents of the components (wt %) other than the content of Fe diffused from the base steel sheet.

In addition, after taking SEM, an optical phase fraction measurement device was used to measure the phase fraction of a MgZn$_2$ phase in the plating layer, and measure an area fraction (%) of an Al single phase present inside the MgZn$_2$ phase to the total cross-sectional area of the MgZn$_2$ phase in the plating layer. At this time, the Al single phase included inside the MgZn$_2$ phase was measured by the method described in the specification of the present disclosure, and a photograph of the cross section of the plated steel sheet, taken by the field emission scanning electron microscope (FE-SEM), as shown in FIG. 2 and mapping results of components so that Mg and Al component distributions were seen, using an electron probe micro analyzer (EPMA), as shown in FIG. 3 were analyzed to measure MgZn$_2$ and the Al single phase separately.

circle-equivalent diameter of 5 μm or more was not formed was measured and evaluation was performed based on the following criteria:

◎: a length of the section where the MgZn$_2$ crystal having a circle-equivalent diameter of 5 μm or more was not formed was less than 100 μm.

○: a length of the section where the MgZn$_2$ crystal having a circle-equivalent diameter of 5 μm or more was not formed was 100 to 200 μm.

Δ: a length of the section where the MgZn$_2$ crystal having a circle-equivalent diameter of 5 μm or more was not formed was 200 to 300 μm.

x: a length of the section where the MgZn$_2$ crystal having a circle-equivalent diameter of 5 μm or more was not formed was 300 μm or more.

<Bendability>

In order to evaluate bendability, a bending test device was used to perform 3T bending, and then the widths of cracks in the plating layer in the bent portion were averaged to perform evaluation based on the following criteria:

◎: an average width of cracks in the plating layer after 3T bending was less than 30 μm.

○: an average width of cracks in the plating layer after 3T bending was 30 μm or more and less than 50 μm.

Δ: an average width of cracks in the plating layer after 3T bending was 50 μm or more and less than 100 μm.

x: an average width of cracks in the plating layer after 3T bending was 100 μm or more.

TABLE 2

| | No. | Plating layer composition (wt %) | | | Plating layer | | Evaluation of properties | | |
|---|---|---|---|---|---|---|---|---|---|
| | | Mg | Al | Zn | Ma* | Mb* | Corrosion resistance | Uniformity | Bendability |
| Example 1 | A | 4.2 | 11.1 | 84.7 | 25 | 1 | ○ | ◎ | ○ |
| Example 2 | B | 5.3 | 12.9 | 81.8 | 34.9 | 15 | ○ | ◎ | ○ |
| Example 3 | C | 5.9 | 16.5 | 77.6 | 43 | 8 | ○ | ○ | ○ |
| Example 4 | D | 6.9 | 21.5 | 71.6 | 49 | 2 | ○ | ◎ | ○ |
| Comparative Example 1 | E1 | 3.9 | 12.2 | 83.9 | 18 | 31 | X | ○ | X |
| Comparative Example 2 | E2 | 11.5 | 24.5 | 64 | 55 | 0 | Δ | ○ | X |
| Comparative Example 3 | F1 | 4.1 | 5.0 | 90.6 | 38 | 0 | ○ | Δ | Δ |
| Comparative Example 4 | F2 | 5.1 | 28.1 | 66.8 | 41 | 0 | ○ | Δ | ○ |
| Comparative Example 5 | G1 | 4.6 | 11.8 | 83.6 | 35 | 35 | ○ | X | ○ |
| Comparative Example 6 | G2 | 5.4 | 14.9 | 79.7 | 45 | 41 | X | Δ | X |
| Comparative Example 7 | H1 | 4.8 | 12.8 | 82.4 | 44 | 33 | ○ | Δ | X |
| Comparative Example 8 | H2 | 5.6 | 13.7 | 80.7 | 48 | 35 | ○ | Δ | Δ |
| Comparative Example 9 | I | 4 | 8.2 | 87.8 | 24 | 0 | ○ | Δ | Δ |
| Comparative Example 10 | J | 5 | 15.2 | 79.8 | 35 | 31 | ○ | Δ | Δ |

Ma*: a phase fraction [%] of the $MgZn_2$ phase in the plating layer
Mb*: an area fraction [%] of the Al single phase present inside the $MgZn_2$ phase to the total cross-sectional area of the $MgZn_2$ phase of the plating layer As seen in Tables 1 and 2, it was confirmed that Examples 1 to 4 in which the plating layer composition and the manufacturing conditions according to the present disclosure were all met had better properties in one or more of corrosion resistance, uniformity, and bendability, as compared with Comparative Examples 1 to 8 in which one or more of the plating layer composition and the manufacturing conditions of the plating layer were not met.

Experimental Example 2

A plated steel sheet was manufactured in the same manner as in Experimental Example 1, except that the shot blast conditions of the following Table 3 were met. At this time, it was confirmed that the same analysis method as Experimental Example 1 was used to form a Zn—Mg—Al-based plating layer was formed on the base steel sheet and a Fe—Al-based inhibition layer was formed between the base steel sheet and the Zn—Mg—Al-based plating layer. In addition, the composition of the plating layer, the phase fraction (Ma*) of the $MgZn_2$ phase in the plating layer, and the area fraction (Mb*) of the Al single phase present inside the $MgZn_2$ phase to the total cross-sectional area of the $MgZn_2$ phase in the plating layer were measured and are shown in the following Table 3.

TABLE 3

| | | Short blast conditions | | | Plating layer composition (wt %) | | | Plating layer | |
|---|---|---|---|---|---|---|---|---|---|
| | | Diameter of metallic ball | Operating speed [mpm*] | Weight of metallic ball per minute [kg/min] | | | | | |
| | No. | | | | Mg | Al | Zn | Ma* | Mb* |
| Example 5 | A | 0.5 | 120 | 1500 | 4.1 | 10.7 | 85.2 | 27 | 30 |
| Example 6 | A | 0.5 | 150 | 3500 | 4.2 | 10.9 | 84.9 | 24 | 15 |
| Example 7 | A | 0.2 | 150 | 2000 | 4 | 10.5 | 85.5 | 24 | 27 |
| Example 8 | B | 5.2 | 100 | 1000 | 5.1 | 13.1 | 81.8 | 45 | 29 |
| Example 9 | B | 5.2 | 160 | 500 | 5.2 | 12.7 | 82.1 | 44 | 28 |
| Example 10 | B | 5.2 | 140 | 200 | 5.1 | 12.9 | 82 | 38 | 20 |
| Example 11 | C | 9.2 | 50 | 300 | 6.1 | 16.5 | 77.4 | 49 | 28 |
| Example 12 | C | 9.2 | 40 | 500 | 5.9 | 16.1 | 78 | 47 | 24 |
| Example 13 | C | 9.2 | 40 | 700 | 6.2 | 16.3 | 77.5 | 45 | 23 |
| Comparative Example 9 | H1 | 11.5 | 70 | 200 | 4.8 | 12.9 | 82.3 | 15 | 0 |
| Comparative Example 10 | H2 | 11.5 | 40 | 3500 | 5.4 | 13.9 | 80.7 | 10 | 0 |

In addition, from the plated steel sheets manufactured in Examples 5 to 13 and Comparative Examples 9 and 10, cut specimens which were cut in a direction perpendicular to a rolling direction of the plating layer were manufactured, and the surface of the plating layer was taken by SEM at a magnification of 1000 times to identify the $MgZn_2$ phase. A color treatment was performed so that the $MgZn_2$ phase in the SEM photograph taken was identified, and then the area of $MgZn_2$ exposed to the surface of the plating layer was determined using the optical phase fraction measurement device, thereby measuring the average circle-equivalent diameter.

In addition, a two-dimensional roughness measurement device was used to measure the surface roughness (Ra) of the plating layer, and a high-speed rotational friction testing machine was used to perform a repeated experiment 30 times to measure the repeated friction coefficient of the surface of the plating layer. In addition, the cross-sectional hardness of the plating layer was measured using the micro hardness measuring device capable of measurement in the thickness of the plating layer.

In addition, the thickness of the inhibition layer was measured as a minimum thickness in a direction perpendicular to the interface described above using SEM and TEM devices. An outburst phase was taken using SEM and an optical microscope. On the cut surface in the thickness direction of the steel sheet, when the interface line of the layer in contact with the base steel sheet is spaced 5 μm apart toward the surface of the plating layer, a ratio of a length occupied by the outburst phase intersecting the spaced line to the length of the spaced line was measured. The measurement results are shown in the following Table 4.

The properties of the plated steel sheets manufactured by the method described above were evaluated on the same criteria as Experimental Example 1 described above and are shown in the following Table 5:

TABLE 5

| | Evaluation of properties | | |
|---|---|---|---|
| | Corrosion resistance | Uniformity | Bendability |
| Example 5 | ◎ | ◎ | ◎ |
| Example 6 | ○ | ◎ | ◎ |
| Example 7 | ◎ | ◎ | ○ |
| Example 8 | ◎ | ◎ | ◎ |
| Example 9 | ◎ | ◎ | ○ |
| Example 10 | ○ | ◎ | ◎ |
| Example 11 | ◎ | ◎ | ◎ |
| Example 12 | ◎ | ○ | ◎ |
| Example 13 | ◎ | ○ | ◎ |
| Comparative Example 9 | Δ | ○ | X |
| Comparative Example 10 | X | ○ | Δ |

As seen in Tables 3 to 5, it was confirmed that Examples 5 to 13 in which the plating layer composition and the manufacturing conditions according to the present disclosure were all met had better properties in one or more of corrosion resistance, uniformity, and bendability, as compared with Comparative Examples 9 and 10 in which any one of the plating layer composition and the manufacturing conditions of the plating layer was not met.

In particular, it was confirmed that corrosion resistance, uniformity, and bendability of Examples 5, 8, and 11 in which a metallic ball at 300 to 3,000 kg/min collided with the surface of the steel sheet moving at a moving speed of 50 to 150 mpm, the metallic ball used having a diameter of 0.3 to 10 μm, were further improved as compared with other examples in Table 3.

TABLE 4

| | | | Plating layer | | | | | |
|---|---|---|---|---|---|---|---|---|
| | Mc* | Md* | Average circle-equivalent diameter of $MgZn_2$ structure exposed to surface of plating layer | Surface (Ra) roughness [μm] | Repeated friction coefficient | Cross-sectional hardness [Hv] | inhibition layer Thickness [μm] | L* |
| Example 5 | 4 | 25 | 10 | 0.5 | 0.7 | 220 | 0.8 | 0 |
| Example 6 | 5 | 20 | 5 | 0.5 | 0.8 | 225 | 0.9 | 0 |
| Example 7 | 4 | 20 | 30 | 0.5 | 1.1 | 230 | 1.1 | 8 |
| Example 8 | 9 | 43 | 45 | 1.5 | 1 | 350 | 0.1 | 0 |
| Example 9 | 8 | 28 | 39 | 1.6 | 1.1 | 370 | 0.05 | 0 |
| Example 10 | 8 | 27 | 40 | 1.5 | 1.2 | 380 | 0.05 | 0 |
| Example 11 | 3 | 15 | 35 | 1.8 | 1.1 | 410 | 0.05 | 0 |
| Example 12 | 2 | 10 | 20 | 2 | 1.2 | 420 | 0.1 | 0 |
| Example 13 | 2 | 10 | 19 | 1.9 | 1.4 | 420 | 0.1 | 0 |
| Comparative Example 9 | 0 | 3 | 5 | 0.3 | 0.17 | 450 | 1.2 | 18 |
| Comparative Example 10 | 0 | 2 | 8 | 3.2 | 0.16 | 460 | 2.2 | 23 |

Mc*: a phase fraction [%] of an Al single phase in the plating layer
Md*: a phase fraction [%] of an Al—Zn mixed phase to the $MgZn_2$ phase in the plating layer
L*: on the cut surface in the thickness direction of the steel sheet, when the interface line of the layer in contact with the base steel sheet is spaced 5 μm apart toward the surface of the plating layer, a ratio [%] of the length occupied by the outburst phase intersecting the spaced line to the length of the spaced line.

The invention claimed is:

1. A plated steel sheet comprising:
   a base steel sheet;
   a Zn—Mg—Al-based plating layer provided on at least one surface of the base steel sheet; and
   a Fe—Al-based inhibition layer provided between the base steel sheet and the Zn—Mg—Al-based plating layer,
   wherein the plating layer includes, by weight, 4 to 10% of Mg and 5.1 to 25% of Al, with a balance of Zn and unavoidable impurities, based on components other than iron (Fe),
   the plating layer includes a $MgZn_2$ phase at a phase fraction of 24 to 50 wt %, and
   an Al single phase is present inside the $MgZn_2$ phase at a ratio of 1 to 30% to a total cross-sectional area of the $MgZn_2$ phase in a thickness direction.

2. The plated steel sheet of claim 1, wherein the $MgZn_2$ phase is exposed to at least a portion of a surface of the plating layer, and an average circle-equivalent diameter of the $MgZn_2$ phase exposed to the surface is 5 to 50 μm.

3. The plated steel sheet of claim 1, wherein a phase fraction of the Al single phase to a total area of the plating layer is 1 to 15%.

4. The plated steel sheet of claim 1, wherein the plating layer has a surface roughness (Ra) of 0.5 to 2.0 μm.

5. The plated steel sheet of claim 1, wherein the inhibition layer is formed of a Fe—Al-based intermetallic compound containing less than 10 wt % of Zn and the Fe—Al-based intermetallic compound is one or more of $Fe_2Al_5$, $FeAl_3$, and $FeAl_5$.

6. The plated steel sheet of claim 1, wherein the inhibition layer has a thickness of 0.02 to 2 μm.

* * * * *